(12) United States Patent
Lang et al.

(10) Patent No.: US 7,058,665 B1
(45) Date of Patent: Jun. 6, 2006

(54) VERIFICATION OF DATA COHERENCY IN WORD-ADDRESSABLE FILES THAT SUPPORT CONCURRENT ACCESS

(75) Inventors: Michelle J. Lang, Minneapolis, MN (US); William Judge Yohn, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 566 days.

(21) Appl. No.: 10/177,085

(22) Filed: Jun. 21, 2002

(51) Int. Cl.
*G06F 17/30* (2006.01)

(52) U.S. Cl. .......................... 707/201; 8/205; 711/113; 711/141

(58) Field of Classification Search ............... 707/1–10, 707/100–104.1, 200–206; 711/141–143, 711/209, 210, 113, 129–136, 155, 171–173; 702/123; 714/43, 703
See application file for complete search history.

(56) References Cited

U.S. PATENT DOCUMENTS

| | | | |
|---|---|---|---|
| 5,371,885 A | * | 12/1994 | Letwin ....................... 707/205 |
| 5,745,915 A | * | 4/1998 | Cooper et al. ............... 711/114 |
| 5,758,149 A | * | 5/1998 | Bierma et al. .................. 707/8 |
| 5,832,526 A | * | 11/1998 | Schuyler ...................... 707/205 |
| 6,122,711 A | * | 9/2000 | Mackenthun et al. ....... 711/135 |
| 6,408,357 B1 | * | 6/2002 | Hanmann et al. ........... 711/113 |
| 6,795,790 B1 | * | 9/2004 | Lang et al. ................. 702/123 |

* cited by examiner

*Primary Examiner*—Shahid Alam
*Assistant Examiner*—Jean Bolte Fleurantin
(74) *Attorney, Agent, or Firm*—Charles A. Johnson; Mark T. Starr; Crawford Maunu, PLLC (57) ABSTRACT

A method and apparatus for testing data coherency in a file system implemented on a data processing arrangement. A record of file addresses is maintained for addresses that are not targeted by write operations, and word address ranges for write operations are selected from the record of file addresses not targeted by other write operations. A plurality of asynchronous write operations that specify word address ranges and data to be written are issued. For each completed write operation, an asynchronous read operation that references the address range of the completed write operation is issued. The data returned from the read operation is verified against data issued in the completed write operation. The record of file addresses not targeted by write operations is updated when the verifying step is complete.

12 Claims, 4 Drawing Sheets

| I/O status table 402 | | | | |
|---|---|---|---|---|
| packet | write range | status | lower ref. | upper ref. |
| 1 ptr  x | 7–17 | in-prog. | 1 | 2 |
| 2      y | 40–50 | in-prog. | 2 | 3 |
| 3      z | 75–85 | in-prog. | 3 | 4 |
|  | ⋮ | | | |
| n |  |  |  |  |

| available range table 404 | | |
|---|---|---|
| avail range | lower ref. | upper ref. |
| 1   0–6 | – | 1 |
| 2   18–39 | 1 | 2 |
| 3   51–74 | 2 | 3 |
| 4   86–100 | 3 | – |
| ⋮ | | |
| n | | |

VERIFICATION OF DATA COHERENCY IN WORD-ADDRESSABLE FILES THAT SUPPORT CONCURRENT ACCESS

FIELD OF THE INVENTION

The present invention relates to testing data coherency in word-addressable files in a data processing system that provides concurrent access to the word-addressable files.

BACKGROUND OF THE INVENTION

To adequately test data coherency in systems that cache file data, concurrent input and output (I/O) operations are performed. One challenge in performing concurrent I/O operations is doing so without introducing complicated and high-overhead data locking schemes. The overhead associated with data locking may change the timing such that some design errors may go undiscovered prior to the system being available to customers.

Another approach to testing data coherency is address tagging. Address tagging involves writing the same data with multiple write requests. This is useful in detecting misplaced data, but is less useful for detecting lost write requests, and of very little use in detecting old data.

A method and apparatus that addresses the aforementioned problems, as well as other related problems, are therefore desirable.

SUMMARY OF THE INVENTION

In various embodiments, the invention provides a method and apparatus for testing data coherency in a file system implemented on a data processing arrangement. A record of file addresses is maintained for addresses that are not targeted by write operations, and word address ranges for write operations are selected from the record of file addresses not targeted by other write operations. A plurality of asynchronous write operations that specify word address ranges and data to be written are issued. For each completed write operation, an asynchronous read operation that references the address range of the completed write operation is issued. The data returned from the read operation is verified against data issued in the completed write operation. The record of file addresses not targeted by write operations is updated when the verifying step is complete.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

In various embodiments, the invention provides a mechanism for verifying input/output (I/O) integrity without restricting file access patterns for multiple concurrent I/O write operations. A single thread is used to issue concurrent, asynchronous write requests to a word-addressable file. Active I/O operations are monitored to ensure that no two concurrent write operations reference overlapping addresses. This allows data to be written and verified with each operation. Because word-addressable files are used, the operations can begin and end on any word offset without requiring adherence to specific boundary conditions. Although active write operations will not address overlapping addresses, write operations are allowed to overlap other architectural boundaries such as sectors, tracks and segments. Address ranges in read operations are allowed to overlap with another other active operation.

Figure 1:
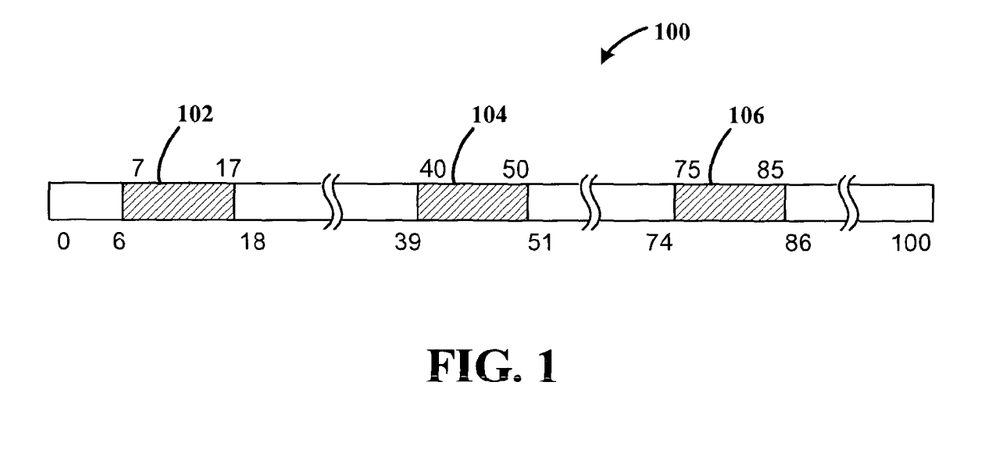
FIG. 1 is a block diagram that illustrates an example word-addressable file in which some segments are available for writing and some segments are in the process of being written.

FIG. 1 is a block diagram that illustrates an example word-addressable file 100 in which some segments are available for writing and some segments are in the process of being written. The segments in the process of being written are segment 102, ranging from word offset 7 to 17, segment 104, ranging from word offset 40 to word offset 50, and segment 106, ranging from word offset 75 to word offset 85. It will be appreciated that byte-addressable files could be used instead of word-addressable files, although some blocking of data may be required because of the limited amount of information that can be contained in a single byte.

A file is generally a logical collection of data, located on (one or more) mass storage devices. The actual physical track locations of the files are transparent to the user, and a device handler manages the locations. In a system where file caching is supported, all or parts of the file may temporarily be located in memory. Once a file has been assigned it is accessed by its (user-supplied) name. Data within the file is addressed by its file-relative word offset.

The present invention supports multiple open files, with all files being assigned at the start of the test. Each file is opened as word-addressable. Word addressable files are addressed by file-relative word offset. Transfers may start at any word boundary. Status information is maintained for each open file. The status includes, for example, the file name, the size (in words) of the file, and pointers to control structures for that maintain status information for the I/O operations.

The invention is described using the 2200 series data processing system from Unisys as an example system to which the invention is applied. Architectural specifications for asynchronous I/O in a 2200 system require that a fixed-sized I/O packet be used for each I/O operation. The I/O packet describes the attributes of the I/O operation (read/write, transfer size, start offset) to the operating system. A status-field in the I/O packet is used by the operating system to report the status of the I/O operation back to the end user. A busy status indicates that the I/O operation has not yet completed. An I/O packet can be associated with one and only one outstanding I/O operation.

In addition to I/O attributes, each I/O packet contains a pointer to an area in user memory, called the I/O buffer. For an I/O-write operation, this buffer contains the data that will be written to the target file. For an I/O-read operation, this buffer represents the area of memory that will receive the data read from the file. An I/O buffer must be large enough to accommodate the I/O transfer size.

Figure 2:
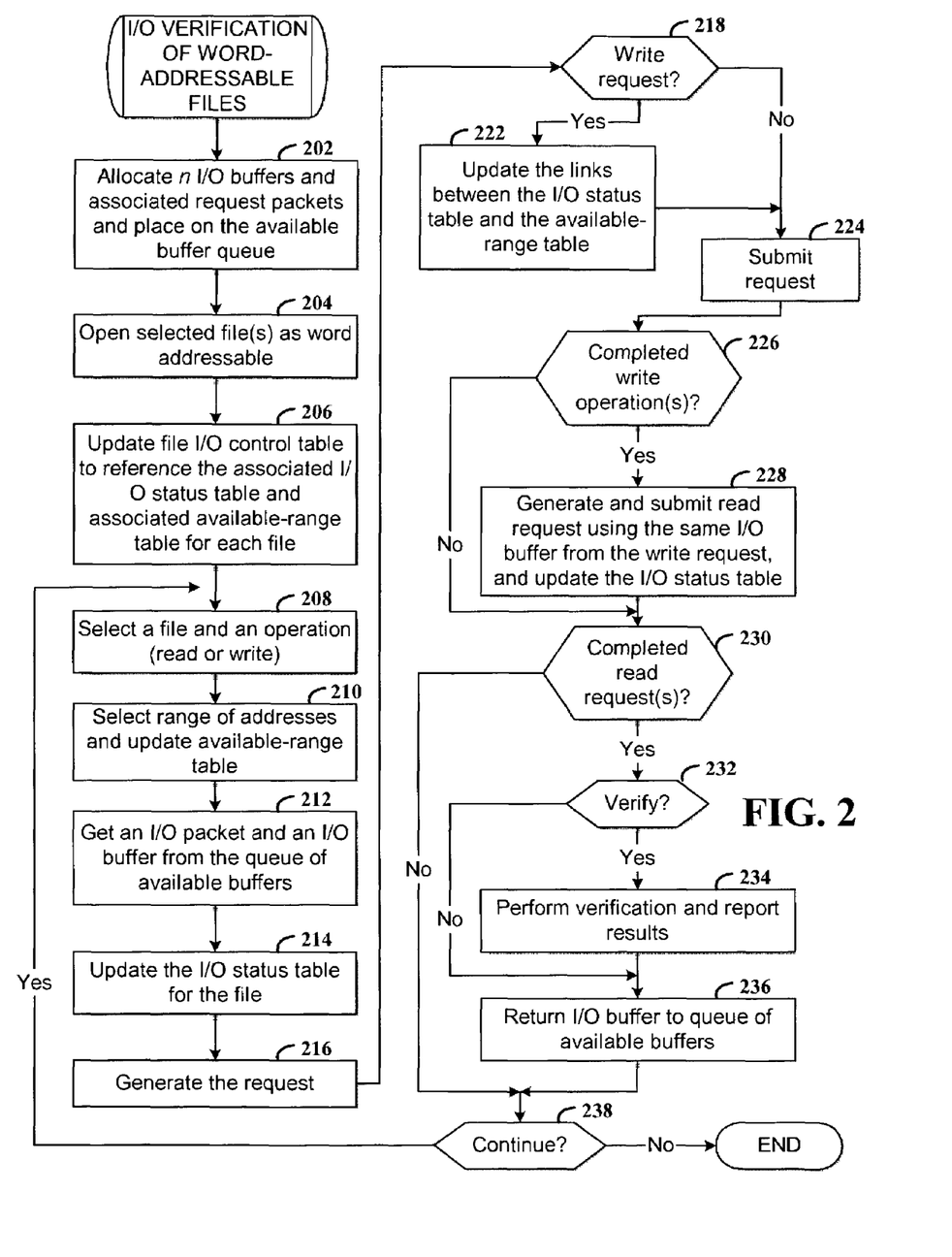
FIG. 2 is a flowchart of a process for verifying data coherency using a single thread to issue concurrent write operations to a word-addressable file.

FIG. 2 is a flowchart of a process for verifying data coherency using a single thread to issue concurrent write operations to a word-addressable file. Because a single thread is issuing the asynchronous word-addressed write requests to the same file, the thread must track which addresses in the file are being written and the status of the write requests. When a write request is complete and the subsequent verification is complete, the area being written can be the object of a subsequent write request.

All the I/O packets and I/O buffers available for use during the test are allocated at the beginning of the process (step 202). I/O packets and buffers are built in pairs, with each I/O packet pointing to its associated buffer. As the packets and buffers are built, the I/O buffers (/packets) are linked together in memory and logically placed on a queue referred to as the available buffer queue. Buffers located on this queue are not currently the target of any outstanding I/O operations and are available for use by a yet un-issued I/O operation. Buffers are allocated until either memory or address range limitations are reached. With n I/O buffers allocated, up to n outstanding I/O(s) can be issued.

For simplicity, I/O buffers are built large enough to accommodate the largest I/O transfer in one embodiment. More complicated distribution schemes could be devised, however, by increasing the number of available buffer queues and using different queues for different sized buffers. Alternatively, buffers can be released and re-allocated at periodic intervals during the test, to accommodate dynamic changes to the transfer sizes. Because of the overhead involved, it is expected that this be done infrequently, except in the event certain (memory) stress conditions are the focus. Buffers need not be allocated at any particular physical memory location. The start addresses of the individual buffers may be adjusted, if desired, so that buffers do not all start within the same word of the cache-line.

One or more files are opened for word-addressable operations (step 204). The particular files are test-dependent.

Figure 3:
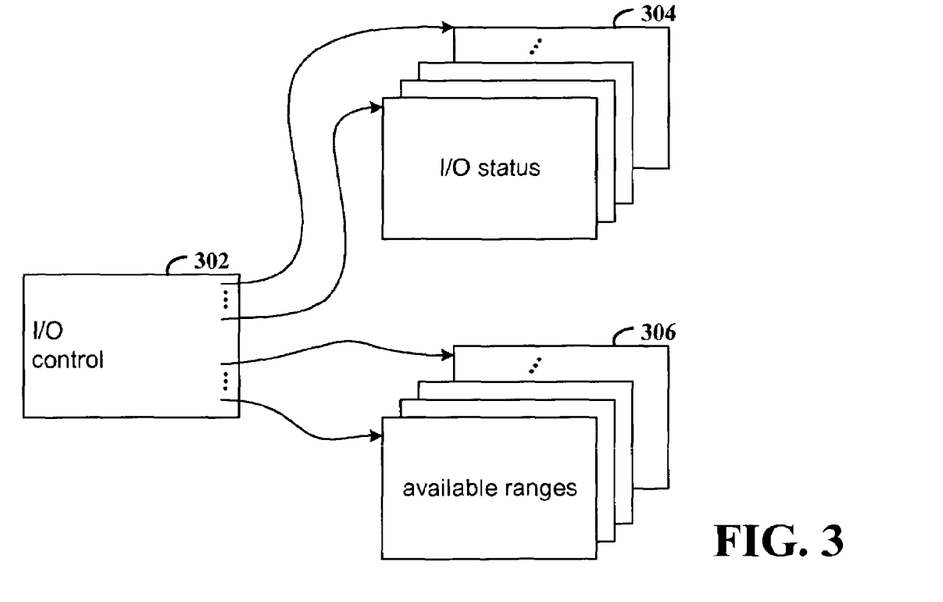
FIG. 3 is a block diagram that illustrates the relationships between an P/o control block and I/O status blocks and available-range blocks.

The single control thread of one embodiment simplifies the verification of data. However, a number of control tables are used to track the status of I/O operations for the files. An I/O control table (FIG. 3, 302) is updated (step 206) to reference for each file an associated I/O status table (FIG. 3, 304) and available-range table (FIG. 3, 306). As each new I/O operation is issued, information that describes the operation is added to the I/O status table associated with the target file. The I/O status table contains information on each outstanding I/O operation, including a status, start-offset, and end-offset. The available-range table is used to track the ranges of file addresses that are not currently targeted by any outstanding I/O-write operation. Outstanding I/O operations and available ranges are linked together to provide the information needed to adjust and redefine ranges after the completion or introduction of a new I/O operation.

The file and operation to be performed are selected (step 208) after the I/O control table is updated. Note that there is no restriction on the order that files are targeted. I/O operations need not be distributed evenly among the assigned files. Files can be targeted in any order. There is no requirement for the I/O distribution to be confined to a single distribution scheme. A comprehensive test may vary the distribution at frequent intervals in order to create queuing at devices or other specific volume related conditions. If the device location of each file is saved when it is assigned, this information can be incorporated into the distribution scheme.

Based on test-specific requirements, a range of addresses is selected (step 210). The selection of the address range can be done at random, sequentially, or a range close to other previously selected ranges. However, for write operations the available-range table is consulted to ensure that the selected range does not overlap an outstanding I/O operation. Additional rules may need to be applied if a test requires a minimal transfer size. It might be necessary, for example, to mark ranges unavailable if they are too small to accommodate the minimum I/O transfer size. The selected range is removed from the available-range table. The process obtains an I/O packet along with an associated I/O buffer (212), and the I/O status table is updated to indicate that the I/O operation is in progress (step 214).

When an I/O operation is first added to the I/O status table, its status is marked as I/O incomplete. Subsequently, the I/O packet associated with the operation is periodically monitored, along with each of the other outstanding I/O operations in the table. When the status in the I/O packet is no longer busy, the operation has physically completed. If the operation was a read, the data can be verified immediately, and the I/O request marked complete.

An I/O packet is prepared using the selected file, operation, and range of addresses (step 216). As described above, all I/O operations use the same I/O buffer queue. To eliminate (unnecessary) overhead, buffers are not cleared before being returned to the queue. Thus, buffers are expected to contain residual data from previous operations. Before issuing an I/O read request, the first word of the buffer is checked to verify that it does not contain data that is aligned on exactly the same words as the read being issued. If this were the case, the I/O read could be lost, but never be detected—since the address tags would be as expected. If the first word does contain data that is so aligned, in one embodiment the target buffer address for the read request is offset by one or more words. A flag indicates that the target address has been offset from the original so that the original address can be restored when the buffer is placed back on the queue. Alternatively, the buffer could be zero-filled before sending the I/O operation. This requires more overhead, but would presumably be an infrequent occurrence.

For an I/O-write operation, a unique timestamp (or random number) is generated and stored in a header attached to the I/O buffer. This timestamp is combined with address tag data to provide unique, verifiable data for each write operation. For greater efficiency on a multi-processor system, the task of updating I/O buffers can be assigned to a separate activity, thereby allowing the main activity additional time to check on the status of other outstanding I/O operations and possibly submit new read-for-verify I/O operations.

Unlike write operations, I/O-read operations do not require an update of the I/O buffer (except in the special case noted above). Read operations may overlap with other read operations and with I/O-write operations. Read operations that are issued asynchronously are not verified explicitly because the data contents cannot be predicted. The area being read could contain data from many previous write transfers. However, if the timestamp and address tag are stored in separate sections of the word, the address tag portion of the data can still be verified for each unsolicited read. For example, in a 2200 system if bits 0–18 contain unique data and bits 18–35 contain an address tag, bits 18–35 can be verified for read operations, and the entire word (bits 0–35) can be verified for write operations.

For write operations (decision step 218), the links between the I/O status table and the available range table are updated (step 222). The I/O status table indicates the address range of the associated I/O operation, and the entry in the I/O status table is linked to adjacent available ranges (if any) in the available range table.

The I/O operation is issued asynchronously (step 224), for example, using an IO$ executive request on a 2200 system. With standard synchronous I/O operations, the issuing thread is deactivated by the operating system until the I/O operation has completed, at which time it will be reactivated. The thread is unavailable during this time, and can complete no further work. With an asynchronous I/O operation, on the other hand, the thread sending the request is not required to wait until the I/O operation is complete. Thus, a single thread may send multiple I/O operations without having to wait for any one to complete. Through the use of asynchronous I/O, it is possible to sustain multiple outstanding I/O requests with a single active thread. By restricting main path execution to a single thread, the test design is simplified. In particular, locking is not required to ensure integrity of internal data structures and queues. I/O buffers can be removed from the available queue, and new I/Os issued, without regard to parallel activity. The operating system I/O infrastructure ensures the proper disbursal of the outstanding requests so that the test activity need only monitor I/O packets for completion.

After submitting a request, the main process thread checks for completed write operation(s) (step 226). For write operations, the written data is verified. An I/O-read of the same address range is issued (step 228). As with the original I/O-write operation, the I/O-read operation is issued asynchronously. The same I/O packet and buffer are used, with the target buffer address adjusted by one or more words to eliminate the need for the flushing of this buffer before the read. Alternatively, if buffers are allocated with at least one extra word available, the start address of the I/O buffer can be adjusted back and forth by one word from the write to the read, thereby causing the read data to be offset from the original write data in the buffer (see FIG. 5). In this way, the buffer can be reused for verification, without the overhead of clearing the buffer prior to submitting the I/O-read request. The status of the I/O-read operation is now changed to "Verification in progress".

When an I/O-read operation has completed (decision step 230), the process checks whether the I/O-read is to be verified (step 232). An I/O-read operation with a "verification in progress" status indicates that the operation was issued in order to verify a write request. Data can be verified when this read has completed. An application may choose to verify all read operations, not just those issued to verify a previous write operation. However, as further described below, these types of read operations can be verified only for address tag information. A read operation of this second type would not have the "verification in progress" flag set. For I/O-read operations needing verification, the I/O buffer is verified for correct contents and the results are output (234). Because the read operation is generated from an outstanding write operation writing these particular words of data, the buffer contents are completely determined by the addresses being read. When the data have been verified, the state of the original I/O operation transfer is marked complete. Once complete, the I/O buffer is returned to the available queue (step 236), where it becomes available for immediate reuse by a subsequent I/O operation. The process continues (step 238) as long as there are more outstanding I/O-write operations and there are more tests to be run.

FIG. 3 is a block diagram that illustrates the relationships between an I/O control structure 302, I/O status structure 304, and available-range structure 306. For each open file there is an associated I/O control structure. An available-range structure 306 is associated with each open file to track the ranges of file addresses that are not currently the target of write operations. The status of each outstanding I/O operation is tracked in a I/O status structure associated with the I/O control structure and having n entries. The value of n represents the maximum number of outstanding I/O operations as constrained by the total number of I/O buffers created at the start of the test. An outstanding I/O operation is defined by its current status, start-offset, and end-offset. Each outstanding I/O entry contains a pointer to the associated I/O packet-buffer pair. An outstanding I/O can have one of the following statuses: I/O-in-progress, verification-in-progress, complete, and invalid.

There can never be more I/O operations outstanding than there are I/O packets and I/O buffers. Because I/O operations are distributed between the open files, the number of outstanding operations to any single file will be much closer to n/m, where m represents the total number of files assigned. The sizes of the individual transfers, the speed of the I/O devices, the operating system overhead, and the internal test overhead will all impact the amount of concurrency actually achievable.

Figure 4:
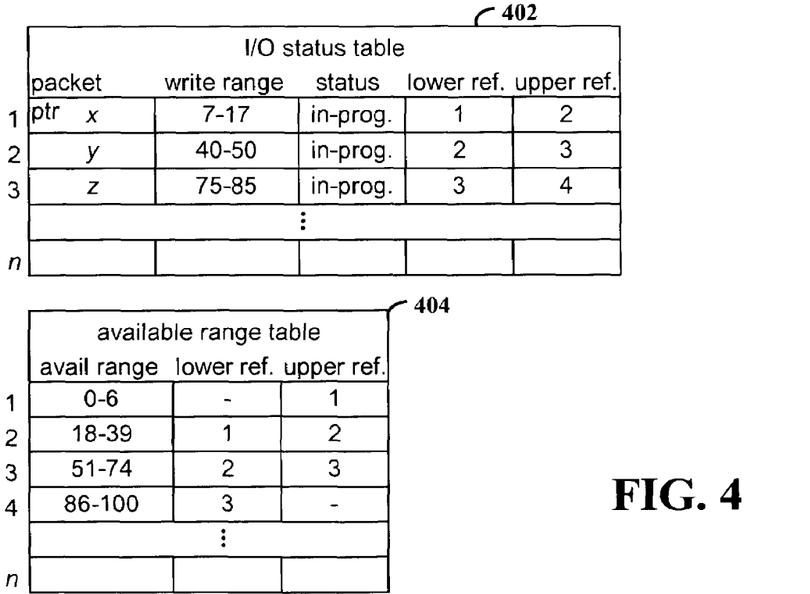
FIG. 4 illustrates an example I/O status table and an example I/O available-range table that implement an I/O status block and an available-range block, respectively.

FIG. 4 illustrates an example I/O status table 402 and an example available-range table 404 that implement an I/O status structure and an available-range structure in accordance with one embodiment of the invention. Each entry in the I/O status table has a valid flag associated with it. Each valid entry represents an outstanding I/O operation tracked by the program. A pointer to the associated I/O packet is kept. The I/O packet can then be monitored to determine when the I/O operation has actually completed (a non-busy status in the packet). It is unnecessary for the test process to be notified immediately when an I/O operation is complete. However, the sooner the I/O operation can be verified, and the sooner the I/O buffer can be returned to the queue and reused for another I/O operation.

Each entry in the I/O status table represents either an I/O-read or an I/O-write operation. An I/O-read operation reads data from a mass storage file, and the data are written to the I/O buffer associated with the I/O packet. An I/O-write operation writes data into a mass storage file, where the data to be written is provided in the I/O buffer associated with the I/O packet. All I/O operations (reads and writes and read-for-verify) are tracked in the I/O status table. However, in the case of read operations that are not associated with verification of a write request, the status is tracked for diagnostic purposes. The target ranges of these types of read operations are not linked to entries in the available range table, and do not need to be included in the I/O status table. The I/O status table also includes the ranges of addresses referenced by I/O-write operations. The lower reference and upper reference values are used to link entries in the I/O status table to entries in the available range table. The collection of ranges specified in the I/O status table and available-range table indicate the total addressable space in the associated file.

The available-range table is used to ensure that that concurrent writes to the same file do not overlap. By tracking available address ranges, based on the currently outstanding I/O-write operations, address ranges that do not overlap with any other currently outstanding I/O-write can be identified. The lower reference and upper reference values in the available-range table are links to entries in the I/O status table that specify adjacent ranges that are the subject of I/O-write operations. The example entries the I/O status table and available-range table correspond to file 100 of FIG. 1. As an example, entry 1 in the I/O status table contains a packet pointer with a value x to an I/O packet that references words in the range of file-relative offset 7–17. The I/O operation is in progress, and the two ranges that are adjacent to range 7–17 are available, as indicated by the lower and upper reference values 1 and 2 that index entries in the available-range table.

Addresses ranges are allowed to be null ranges (containing zero bytes). This can occur when an I/O transfer starts at the beginning of the file, ends at the last addressable word, or whenever two transfers are adjacent, with no intervening bytes. These cases can be treated as just special cases of a range with start and end bytes of zero.

It will be appreciated that in an alternative embodiment, the lower and upper reference values in the I/O status table and available-range table could be implemented using pointers instead of index values.

When an outstanding I/O-write operation completes, the target address range becomes available for new I/O operations. The two available ranges on either side of the transfer combine to form a larger range, which includes the words from each of the two ranges, as well as the words associated with the completed I/O operation. In this case, the upper limit of the largest range becomes the upper limit of the combined range. The entry for the higher of the two ranges is removed because the lower range is enlarged. The entry in the I/O status table that references the second range entry is adjusted to reference the new combined range.

In the special case of two adjoining I/O transfers, each transfer points to only one available range, with the other pointer being null. When one of these I/O operations completes, the upper (or lower) limit of the transfer is used as the new upper (or lower) limit of the combined range.

When a new I/O-write operation is ready to be issued, a target range is selected from one of the currently available ranges. The available range must now split into two new ranges—removing the words that are now reserved for the I/O operation. The start address of the I/O transfer becomes the new upper limit of the first part of the split available range. A new entry is added to the available-range table. The lower limit of this range is the end address of the I/O operation. The upper limit of this new range is the original upper limit. Adjustments must be made to the pointers, as the first split of the range is adjacent to the new I/O operation.

Figure 5:
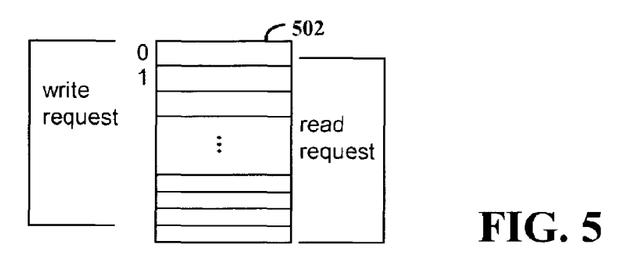
FIG. 5 is a block diagram that illustrates an I/O buffer and the areas in which data to be written to a file are stored and data read from a file are stored.

FIG. 5 is a block diagram that illustrates an I/O buffer 502 and the areas in which data to be written to a file are stored and data read from a file are stored. In one embodiment of the invention, the same I/O packet and buffer are used for an I/O-write operation that is followed by an I/O-read operation to verify the results of the write.

The allocated size of the I/O buffers is made to be one word greater than the maximum size contemplated for the test. For an I/O-write operation, the data in the buffer are addressed beginning at word 0, and for an I/O-read operation, the data in the I/O buffer ad addressed beginning at word 1. This causes the read data to be offset from the original write data in the buffer, which supports data verification without having to clear the I/O buffer after the write and before the read.

Figure 6:
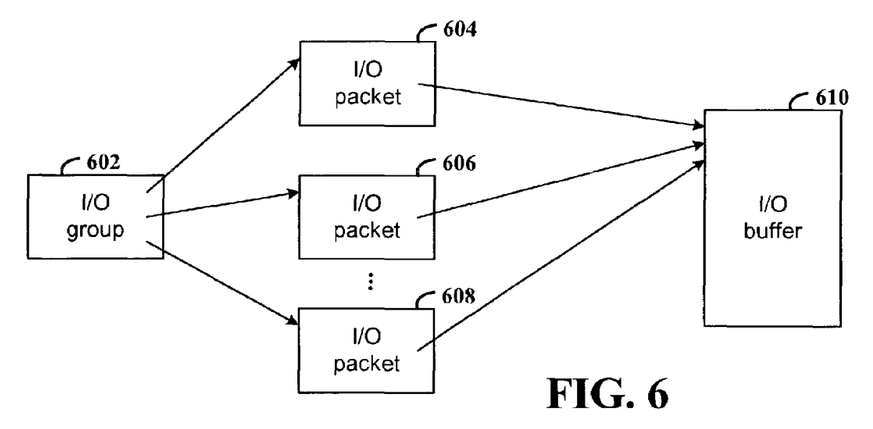
FIG. 6 is a block diagram that illustrates an I/O group that includes a related set of I/O requests sharing an I/O buffer.

FIG. 6 is a block diagram that illustrates an I/O group 602 that includes a related set of I/O packets 604, 606, 608 sharing an I/O buffer 610. The description up to this point has focused on ensuring that no two I/O write transfers (explicitly) overlap. In another embodiment, the invention supports and enforces a selected level of overlapping I/O-write operations. This may be desirable in some architectures where overlapping operations across explicit word boundaries is believed to produce conditions within the I/O system which otherwise could not occur.

Two variations are described. The first variation is applicable to any caching or non-caching I/O system is described in association with FIG. 6. The second variation is targeted at systems that guarantee atomic completion of I/O operations, for example 2200 systems, and is described in association with FIG. 7.

In the first variation, I/O buffers and I/O packets are allocated at initiation. However, rather than having a one-to-one correspondence between I/O buffers and I/O packets, multiple I/O packets are allocated for each I/O buffer. Since I/O packets require little additional memory, this will not significantly impact the number of I/O buffers that may be allocated. It will however, result in the potential for more outstanding I/Os.

These I/O packets, along with their associated I/O buffer, combine to form what is called an I/O-group. It is the I/O groups, rather than I/O buffers, that are chained together to form the available buffer queue. An I/O group is characterized as a set of I/O packet pointers, which reference a set of I/O packets, each of which references the same I/O buffer.

The process of selecting a target range for the next I/O remains the same for an I/O group as for single I/O packets. The available-range table is used to find an available range for the next I/O transfer. An entry is made in the I/O status table, and the appropriate links are made between the outstanding I/O and its adjacent available ranges. Except for changes required during verification, and a slight modification to the format of an individual outstanding I/O entry, the fact that the I/O transfer will actually be submitted as multiple overlapping requests remains largely transparent.

In an I/O group, each outstanding I/O entry contains values indicating the upper and lower limits of its target range. For a write operation, the entry contains pointers to each of its adjacent available ranges. However, instead of a single I/O packet pointer, a pointer to each I/O packet in the group is required. In addition, the start address of the I/O buffer must be saved because it may become modified in the individual I/O packets.

Once the target range has been determined, a unique timestamp is generated for each I/O-group, which represents overlapping write transfers. Following this, the I/O buffer is updated in preparation for the transfer. The I/O request is then ready to be issued. Instead of issuing an I/O as a single request, the transfer is split up into multiple overlapping requests—one for each I/O packet in the group. The manner in which the I/Os overlap is determined based on test requirements. However, a minimal requirement is that the entire target range be addressed.

An example 100-word operation is used to describe several possible ways of splitting the range. Note that if operations are defined so that each operation has both an overlapping, and a non-overlapping section (as in Example-3), it is possible to determine whether every I/O operation has completed. As such, this method of overlapping may be preferable where the risk of lost I/Os is considered relatively high. However, schemes such as Example-1 provide more complicated overlapping of I/O operations, along with the possibility of up to three simultaneously overlapping I/Os.

In Example 1, operation 1 addresses words 1–100, operation 2 addresses words 10–49, and operation 3 addresses words 29–80.

In Example 2, operation 1 addresses words 1–100, operation 2 addresses words 1–49, and operation 3 addresses words 50–100.

In Example 3, operation 1 addresses words 1–50, operation 2 addresses words 61–100, and operation 3 addresses words 25–75.

In Example 3, each of the three overlapping I/O operations reference the same I/O buffer. Assuming these are write operations, the buffer is initialized with a combination of timestamp and address-tag data. The range of addresses in the buffer will be word-1 through word-100, as consistent with the target range of the associated outstanding I/O operation. Each I/O packet will point to the area of the I/O buffer that corresponds to its own start offset.

An outstanding I/O group is not considered complete until each of its constituent I/O operations have completed (all I/O packets have a non-busy status). In the case of an outstanding I/O-write operation, the operation is not considered complete until it has actually been verified.

Verification is performed after all overlapping I/O-write operations have completed and is performed in the same manner as for verification of a single I/O-write operation. The read-for-verify I/O operation is issued asynchronously and issued as a single request that spans the full target address range. Any of the associated I/O packets may be used for this purpose as long as the start-offset and transfer size is saved for diagnostic purposes.

Because all overlapping I/O-write operations have completed, the address of the I/O buffer used for the read-for-verify operation is adjusted by one word without undue consequences. As noted above, this technique is used to eliminate the need to rewrite the I/O buffer prior to the read, while still ensuring that a lost read can be detected. Data verification proceeds as before, with the knowledge that no other outstanding I/O targets overlapping address ranges.

Once the read-for-verify I/O has completed and the data has been verified, the outstanding I/O operation is marked complete, and the available-range table adjusted. Finally, I/O packets and associated I/O buffer of the I/O-group are returned to the available queue.

It will be appreciated that verification can be performed for individual operations as they complete. Using the original I/O packet, an asynchronous read-for-verify I/O operation is issued. Unlike the case of final verification, however, the I/O buffer address is not adjusted for this read because there may be active I/O-write operations that target this buffer.

Apart from the overlapping I/O operations that form part of an I/O group, no other outstanding I/O operation is allowed to write to the address range covered by the I/O group. I/O operations that belong to the same I/O group write data of the same format, which permits verification of data in the referenced address range. Because the I/O buffer address is not adjusted, data that is read into the buffer should be identical to the original contents.

While it is possible that a lost read operation would not be detected in this type of I/O group, data verification of an I/O group may be desirable for a particular system architecture.

Allowing verification at this time, means that I/O-read operations and I/O-write operations may target not only the same file address ranges, but also the same buffer addresses. However, it is possible that this interspersing of I/O-read operations may affect the ability to maximize outstanding write operations to the file. If this is suspected, the preliminary verification stage may be skipped. Or, it may be done solely on a sample basis.

Figure 7:
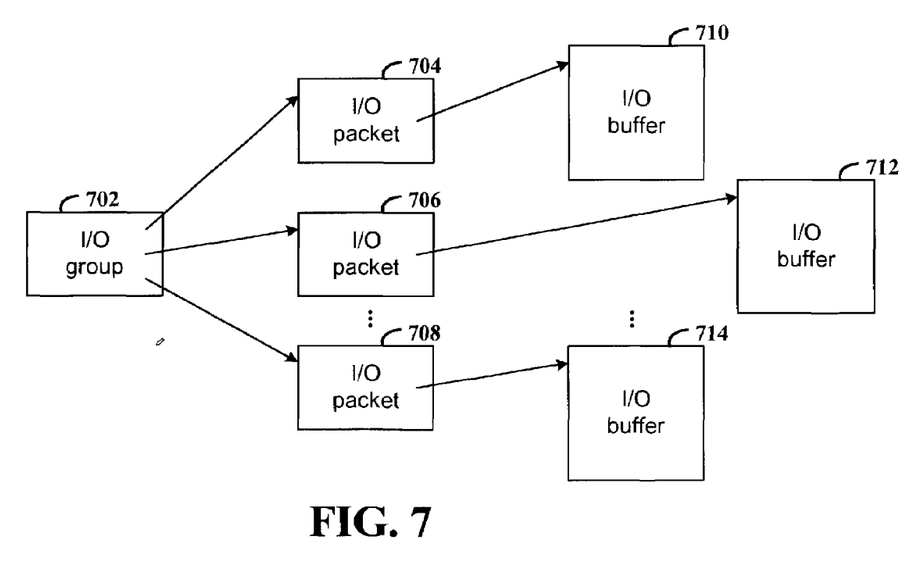
FIG. 7 is a block diagram that illustrates an I/O group that includes a related set of I/O requests, each request having a dedicated I/O buffer.

FIG. 7 is a block diagram that illustrates an I/O group 702 that includes a related set of I/O packets 704, 706, 708, each packet having a dedicated I/O buffer 710, 712, 714. For some I/O architectures I/O operations are guaranteed to be atomic. That is, an operation will complete in its entirety as a single uninterruptable operation. The order of I/O operation completion can be used to predict the outcome when multiple overlapping I/O-write operations target the same area of a file.

For example, consider three overlapping I/O operations where T1 writes a series of '1's to the file. T2 writes a series of '2's. And T3 writes a series of '3's. On a system that does not guarantee atomic I/O operations, the data in the file after all three transfers complete is largely unpredictable. The file may contain any combination of '1's, '2's, and '3's. On the other hand, with atomic I/Os, the result will be all '1's, all '2's, or all '3's—depending on which I/O completes last.

On an architecture that guarantees atomic I/O operations, there is some benefit to allowing concurrent overlapping I/O operations that write unique data because there is some ability to predict data outcome based on a derived order of operation completion. In this case, operations are grouped for overlap, with each I/O packet linked to a separate I/O buffer. Each I/O buffer is initialized with unique data.

Test execution proceeds as previously described, with verification taking place once all I/O operations in the group are complete. In this case, however, the contents of the file cannot be completely determined. For example, consider three overlapping I/O operations: T1 writes "1"s to words 0–14, T2 writes "2"s to words 6–17, and T3 writes "3"s to words 10–20.

Because the operations are atomic, the file contents depend on the order in which the operations complete. With three concurrent operations, there are 3!=6 different orders of completion. So, at most there may be six different possibilities for data contents. For this example only five of the completion orders result in unique data sequences:

| | |
|---|---|
| $T_1 \rightarrow T_2 \rightarrow T_3$ | 111111222233333333333 |
| $T_1 \rightarrow T_3 \rightarrow T_2$ | 111111222222222222333 |
| $T_2 \rightarrow T_1 \rightarrow T_3$ | 111111111133333333333 |
| $T_2 \rightarrow T_3 \rightarrow T_1$ | 111111111111111333333 |
| $T_3 \rightarrow T_1 \rightarrow T_2$ | 111111222222222222333 |
| $T_3 \rightarrow T_2 \rightarrow T_1$ | 111111111111111222333 |

The ranges for the three transfers are [0–14], [6–17], and [10–20]. These transfers can be thought to divide the address range [0–20] into five distinct ranges: [0–5], [6–9], [10–14], [15–17], and [18–20]. This was determined visually, but i sequence is (S,S,S,E,E,E), where S=start, and E=end.

Given this sequence, the ranges can be created as follows. The first range always starts with the left-most entry—in this case 0.

[0–]

The upper limit is either the number to the right (if the number to the right is a start address), or one less than that number (if the number to the right is an end address). In this example, because 6 is a start address, the upper limits is 5.

[0–5]

The next range always starts with the upper range of the previous range plus one. In this example the beginning of the next range is 6.

[0–5], [6-]

The same rules apply for determining the upper limit of each subsequent. Because the number to the right (10) is a start address, the upper limit is 9=(10–1).

[0–5], [6–9]

The next range starts with 10. It has an upper limit of 14, since 14 is an end address.

[0–5], [6–9], [10–14]

This continues until the last number in the sequence is used. At this point all the ranges have been determined.

[0–5], [6–9], [10–14], [15–17], [18–20]

Table 1 shows that each range has between one and three I/O transfers which target it.

TABLE 1

| Range | Transfers | Count |
|---|---|---|
| [0–5] | 1 | 1 |
| [6–9] | 1, 2 | 2 |
| [10–14] | 1, 2, 3 | 3 |
| [15–17] | 2, 3 | 2 |
| [18–20] | 3 | 1 |

Ranges targeted by a single I/O operation can be completely determined. The contents of the range will correspond to the data written by that transfer. Other ranges are less completely determined. However, using the fact that I/Os are atomic, rules can be applied to minimize the number of possibilities. Choosing a range (if one exists) that is targeted by all three outstanding I/O operations will help predict the results of subsequently written ranges because the range will indicate which of the three I/Os completed last.

For example, suppose that range [10–14] is found to contain "3"s. Because all three I/O operations target this same range, it can be inferred that operation T3 completed last. This then predicts the contents of any other ranges that are targeted by transfer T3, regardless of the other overlapping transfers. In this example, range [15–17] must also contain "3"s. Range [6–9] is less deterministic. However, if the first word in the range is a "1", all other words must be "1"s. Similarly, if a "2" is detected, all words in the range must contain "2"s.

This can be generalized to n overlapping I/O operations. There will be at most (n!) possibilities for data contents. Using the rules described above, the actual number of possibilities can be reduced. Except in the case of all I/O operations completely overlapping (where there will be exactly n possibilities) each case will have at least one part of the range that can be completely determined.

It will be appreciated that the techniques of FIGS. 6 and 7 can be used in combination where some I/O groups have multiple I/O packets associated with a single I/O buffer, and other I/O groups have multiple I/O packets associated with respective I/O buffers.

On a multi-processor system, the processes of invention are distributed between multiple active threads in an example embodiment. With careful distribution of the logical tasks, multiple threads increase overall efficiency of the design and I/O throughput without adding undue complication. The tasks to be performed can be divided into the following major categories: main control, buffer initialization, issuing of I/O, and data verification.

The main control of the test process remains in a single thread. This is the only thread having access to the I/O status table(s) and available-range table(s). This thread monitors outstanding I/O operations and tracks available address ranges. The main control thread also removes I/O buffers from the available queue, and selects attributes and ranges for the next I/O operation (or I/O group).

Rather than issuing all I/O operations from the main control thread, on a multi-processor system the task of issuing operations is distributed among a pool of previously created worker threads. One or more worker threads can be used. Assigning one worker thread per (remaining) active processor would typically produce maximum benefit. Worker threads can be dedicated to individual processors.

The main thread uses information that indicates which threads are assigned to which processors to better distribute work among the threads. This supports maximizing throughput, creating stress conditions, and focusing tests on certain areas of the I/O architecture. I/O operations are uniformly or randomly distributed between the active threads, depending on test requirements. On architectures where logical paths to a device may be longer for some processors that for other processors, the main control thread distributes work to threads executing on processors with the longest path, for example. In another example, the main thread restricts I/O operations to worker threads executing on processors that do (or do not) share a data cache with the processor hosting the main control thread. Splitting up overlapping I/Os across processors on disjoint caches is another example.

The main control thread need not use the same distribution scheme throughout the test. For example, a comprehensive test may support multiple distribution schemes. The distribution scheme used to distribute I/O operations between the worker threads can change dynamically at any time without adverse effect.

As in the embodiment having a single thread, the main control thread monitors the status of each outstanding operation. The fact that the I/O operation is issued by another thread is largely transparent. Because the main thread is unaware of the exact time that the worker thread issues the operation, the status of the I/O packet will be initialized to busy just prior to passing it to the worker thread for issuance. Once the packet has been issued by worker thread and the physical I/O has completed, the operating system changes the status to non-busy, as appropriate. The main thread then recognizes that the I/O operation has completed and continues processing the request as in the single-thread embodiment.

Each worker thread has access to a thread-unique table that contains space for up to (T*P) I/O packet pointers, where T is the size of the I/O status table and P represents the number of I/O packets per I/O-group. An associated flag indicates whether the operation has been submitted by the worker thread or represents a new request.

When the main thread distributes a new I/O operation to a worker thread, the main thread need only add an entry to thread-unique table. Once the I/O operation has been issued, the worker thread has no further need for the I/O packet pointer because it has no responsibility for monitoring its completion. The worker thread sets the submitted-flag, which indicates to the main thread that the entry may be reused. When adding a new I/O entry, the main thread is required to update the I/O packet pointer portion of the entry first. Following this, the submitted-flag can be cleared. This ensures that a worker thread will always find a valid I/O packet address.

Except possibly for diagnostic purposes, the main thread does not need to save information on which worker thread is currently assigned to issue which I/O operation. However, in order to distribute I/O operations in something other than a random manner, the main thread tracks the number of outstanding requests associated with each worker thread. This is accomplished in an example embodiment by maintaining a single-word counter for each worker thread. A pointer to this counter is included in the header section of each I/O packet. When an I/O operation is distributed to a worker thread, the main thread increments the counter. When an operation completes, the main control thread decrements the counter.

The techniques described above relate as benefit of using multiple worker threads to issue I/O operations, adding functionality (e.g., the ability to create certain stress and architectural conditions), rather than improving I/O throughput. There may be some throughput improvement, however, by as a result of distributing the IO$ system call overhead across the system. However, if the task of initializing the I/O buffers is moved to these worker threads as well, additional benefits in this area will be realized. Recall that I/O-buffers are initialized with unique data prior to issuing any I/O-write request. This initialization cannot be done until the target range for the I/O transfer has been determined because part of the data being written to the buffer consists of address tag information. This initialization process can be a high overhead task, especially in the case of I/O operations referencing large address ranges. Performing this initialization by the worker threads distributes this task more evenly across the system.

In the case of an I/O-group having all I/O packets pointing to a single I/O buffer, individual worker threads perform initialization, for example. Each worker thread initializes the portion of the I/O buffer associated with its I/O packet. Note that some areas of the I/O buffer may be initialized more than once, depending on the level of overlap of the I/O operations. However, if the timestamp is picked in advance, each thread will write the same data. Allowing the individual threads to initialize the buffer may mean that a memory-write and I/O write are targeting the same buffer simultaneously, which may be advantageous for testing aspects of some caching systems.

In cases of I/O-groups having many I/O packets per buffer, large amounts of I/O-group overlap, and/or very small transfers, leaving the task of updating the buffer with the main thread may be advantageous. Also, it may be desirable to initialize the buffer by a processor other than the processor issuing the I/O operation so as not to have cache-lines associated with the I/O buffer resident in the processor's cache. The decision as to where the I/O buffer should be initialized can be treated as a dynamic decision, for example. The same criterion need not be used for the entire course of the test. The header section of the I/O buffer could be used to indicate to a worker thread whether the buffer needs initialization or not.

In an example embodiment, the main thread deactivates a worker thread when the associated outstanding I/O count is zero. A worker thread is reactivated when needed to issue a new I/O operation.

In addition to initialization of I/O buffers, another task with (relatively) high overhead is the verification of data. This is another task that would benefit from being moved to a thread other than the main thread. In addition to the available buffer queue, a verification queue holds I/O buffers (/packets) awaiting verification.

A separate activity, dedicated to data verification, monitors the verification queue and performs data verification for any buffers found on the queue. The associated I/O operation indicates whether the operation is a read or write request. The I/O buffer header contains the timestamp (or random) number used if this is a verification of an I/O-write operation.

The verification thread returns the I/O packet (/buffer) to the available buffer queue. Note that since two threads now have access to the available buffer queue—one to remove buffers and one to add buffers—the links need to be protected with a locking mechanism.

In another embodiment, multiple threads are used for data verification. Each verification thread scans the verification queue for buffers that need to be verified. The buffers are removed as they are found. The number of verification threads is variable according to processing needs. If the verification queue becomes larger than a selected size, the main thread creates additional verification threads. Similarly, the main thread deletes or deactivates threads when no longer needed. Generally, more verification threads are required for large address ranges of I/O operations transfers than for smaller ranges, especially during periods predominated by I/O-write operations. The cache location of the I/O buffer relative to the original I/O operation is also a consideration in choosing to assign multiple verification threads. As with all threads created by the test, verification threads are dedicated to individual processors or groups of processors, as desired.

Accordingly, the present invention provides, among other aspects, a method and apparatus for verification of data coherency in word-addressable files that support concurrent access. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for testing data coherency in a file system implemented on a data processing arrangement, comprising the steps:

maintaining a record of file addresses not targeted by write operations;

selecting a word address range for each write operation from the record of file addresses not targeted by other write operations;

allocating a plurality of I/O packets and respectively associated I/O buffers;

creating at least one I/O group that includes a plurality of I/O packets associated with respective I/O buffers, each I/O group having an associated group address range, wherein the I/O packets in the group are configured with write operations that address overlapping sub-ranges of the group address range, and each respective I/O buffer contains data different from data in the other respective I/O buffers;

selecting a group address range for an I/O group from the record of file addresses not targeted by other write operations;

issuing a plurality of asynchronous write operations that specify word address ranges and data to be written, wherein each write operation in an I/O packet is issued with data to be written to a file stored in the associated I/O buffer;

for each completed write operation, issuing an asynchronous read operation in the I/O packet used for the write operation and referencing the address range of the completed write operation and providing the associated I/O buffer for data read from the file;

when write operations within an I/O group are complete, issuing an asynchronous read operation referencing the address range of the I/O group;

verifying data returned from the read operation against data issued in the completed write operation; and updating the record of file addresses not targeted by write operations when the verifying step is complete.

2. The method of claim 1, further comprising:
when an I/O buffer is used for a write operation, storing data to be written in the buffer beginning at a first location in the I/O buffer; and
when the I/O buffer of a write operation is reused for a read operation, storing data read from the file in the I/O buffer beginning at a second location different from the first location.

3. The method of claim 1, further comprising:
creating at least one I/O group that includes a plurality of I/O packets associated with a single I/O buffer, each I/O group having an associated group address range, wherein the I/O packets in the group are configured with write operations that address overlapping subranges of the group address range;
selecting a group address range for an I/O group from the record of file addresses not targeted by other write operations; and
when write operations within an I/O group are complete, issuing an asynchronous read operation referencing the address range of the I/O group.

4. The method of claim 1, further comprising:
maintaining a status structure that indicates a status of each issued write operation and associated address range;
maintaining the record of file addresses not targeted by write operations in an available-range structure; and
linking adjacent address ranges between the status structure and the available-range structure.

5. The method of claim 4, further comprising:
maintaining a status structure for each file to which write operations are directed; and
maintaining an available-range structure for each file to which write operations are directed.

6. The method of claim 4, further comprising:
allocating a plurality of I/O packets and respectively associated I/O buffers;
issuing each write operation in an I/O packet with data to be written to a file stored in the associated I/O buffer; and
for each completed write operation, issuing the asynchronous read operation in the I/O packet used for the write operation and providing the associated I/O buffer for data read from the file.

7. The method of claim 6, further comprising:
when an I/O buffer is used for a write operation, storing data to be written in the buffer beginning at a first location in the I/O buffer; and
when the I/O buffer of a write operation is reused for a read operation, storing data read from the file in the I/O buffer beginning at a second location different from the first location.

8. The method of claim 1, wherein the data processing arrangement includes a plurality of processors, the method further comprising distributing the steps of testing data coherency in the file system on the plurality of processors.

9. An apparatus for testing data coherency in a file system implemented on a data processing arrangement, comprising:
means for maintaining a record of file addresses not targeted by write operations;
means for selecting a word address range for each write operation from the record of file addresses not targeted by other write operations;
means for allocating a plurality of I/O packets and respectively associated I/O buffers;
means for creating at least one I/O group that includes a plurality of I/O packets associated with respective I/O buffers, each I/O group having an associated group address range, wherein the I/O packets in the group are configured with write operations that address overlapping subranges of the group address range, and each respective I/O buffer contains data different from data in the other respective I/O buffers;
means for selecting a group address range for an I/O group from the record of file addresses not targeted by other write operations;
means for issuing a plurality of asynchronous write operations that specify word address ranges and data to be written, wherein each write operation in an I/O packet is issued with data to be written to a file stored in the associated I/O buffer;
means for issuing an asynchronous read operation in the I/O packet used for the write operation and referencing the address range of a completed write operation and providing the associated I/O buffer for data read from the file for each completed write operation;
means, responsive to write operations within an I/O group being complete, for issuing an asynchronous read operation referencing the address range of the I/O group;
means for verifying data returned from the read operation against data issued in the completed write operation; and
means for updating the record of file addresses not targeted by write operations when the verifying step is complete.

10. An article of manufacture, comprising:
a computer-readable medium configured with program code for causing a computer to perform the steps of,
maintaining a record of file addresses not targeted by write operations;
selecting a word address range for each write operation from the record of file addresses not targeted by other write operations;
allocating a plurality of I/O Packets and respectively associated I/O buffers;
creating at least one I/O group that includes a plurality of I/O packets associated with respective I/O buffers, each I/O group having an associated group address range, wherein the I/O packets in the group are configured with write operations that address overlapping subranges of the group address range, and each respective I/O buffer contains data different from data in the other respective I/O buffers;
selecting a group address range for an I/O group from the record of file addresses not targeted by other write operations;
issuing a plurality of asynchronous write operations that specify word address ranges and data to be written, wherein each write operation in an I/O packet is issued with data to be written to a file stored in the associated I/O buffer;

for each completed write operation, issuing an asynchronous read operation in the I/O packet used for the write operation and referencing the address range of the completed write operation and providing the associated I/O buffer for data read from the file;

when write operations within an I/O group are complete, issuing an asynchronous read operation referencing the address range of the I/O group;

verifying data returned from the read operation against data issued in the completed write operation; and updating the record of file addresses not targeted by write operations when the verifying step is complete.

11. The article of manufacture of claim 10, wherein the computer-readable medium is further configured with program code for causing a computer to perform the steps of:

when an I/O buffer is used for a write operation, storing data to be written in the buffer beginning at a first location in the I/O buffer; and when the I/O buffer of a write operation is reused for a read operation, storing data read from the file in the I/O buffer beginning at a second location different from the first location.

12. The article of manufacture of claim 10, wherein the computer-readable medium is further configured with program code for causing a computer to perform the steps of:

creating at least one I/O group that includes a plurality of I/O packets associated with a single I/O buffer, each I/O group having an associated group address range, wherein the I/O packets in the group are configured with write operations that address overlapping subranges of the group address range;

selecting a group address range for an I/O group from the record of file addresses not targeted by other write operations; and when write operations within an I/O group are complete, issuing an asynchronous read operation referencing the address range of the I/O group.

* * * * *